June 9, 1925.
E. ANDERSON
1,541,677
APPARATUS FOR ELECTRICAL PRECIPITATION OF SUSPENDED PARTICLES FROM GASES
Filed April 24, 1924   3 Sheets-Sheet 1
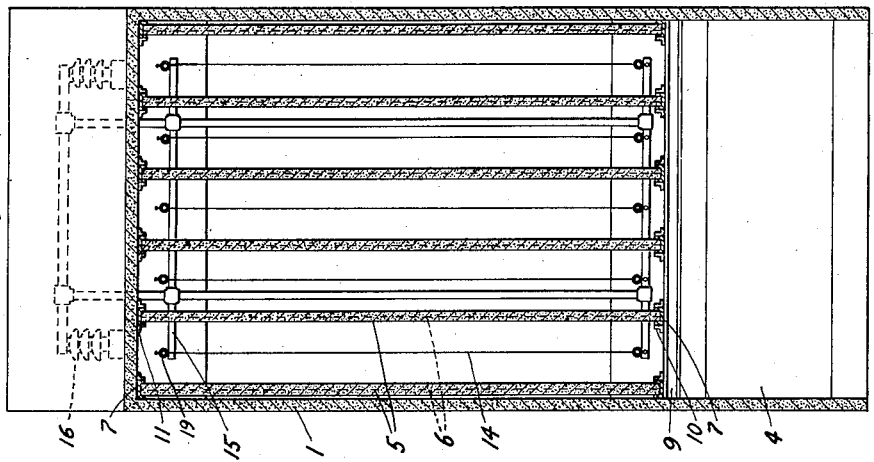
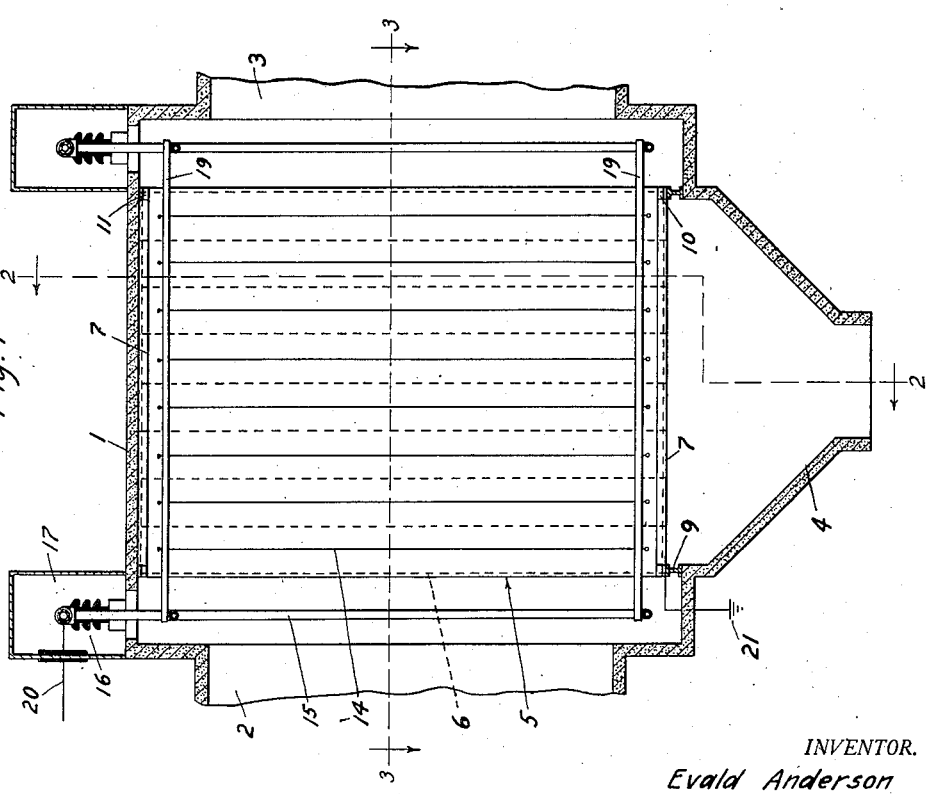
INVENTOR.
Evald Anderson
BY Arthur P. Knight
ATTORNEY.

INVENTOR.
Evald Anderson
BY
*Arthur P. Knight*
ATTORNEY.

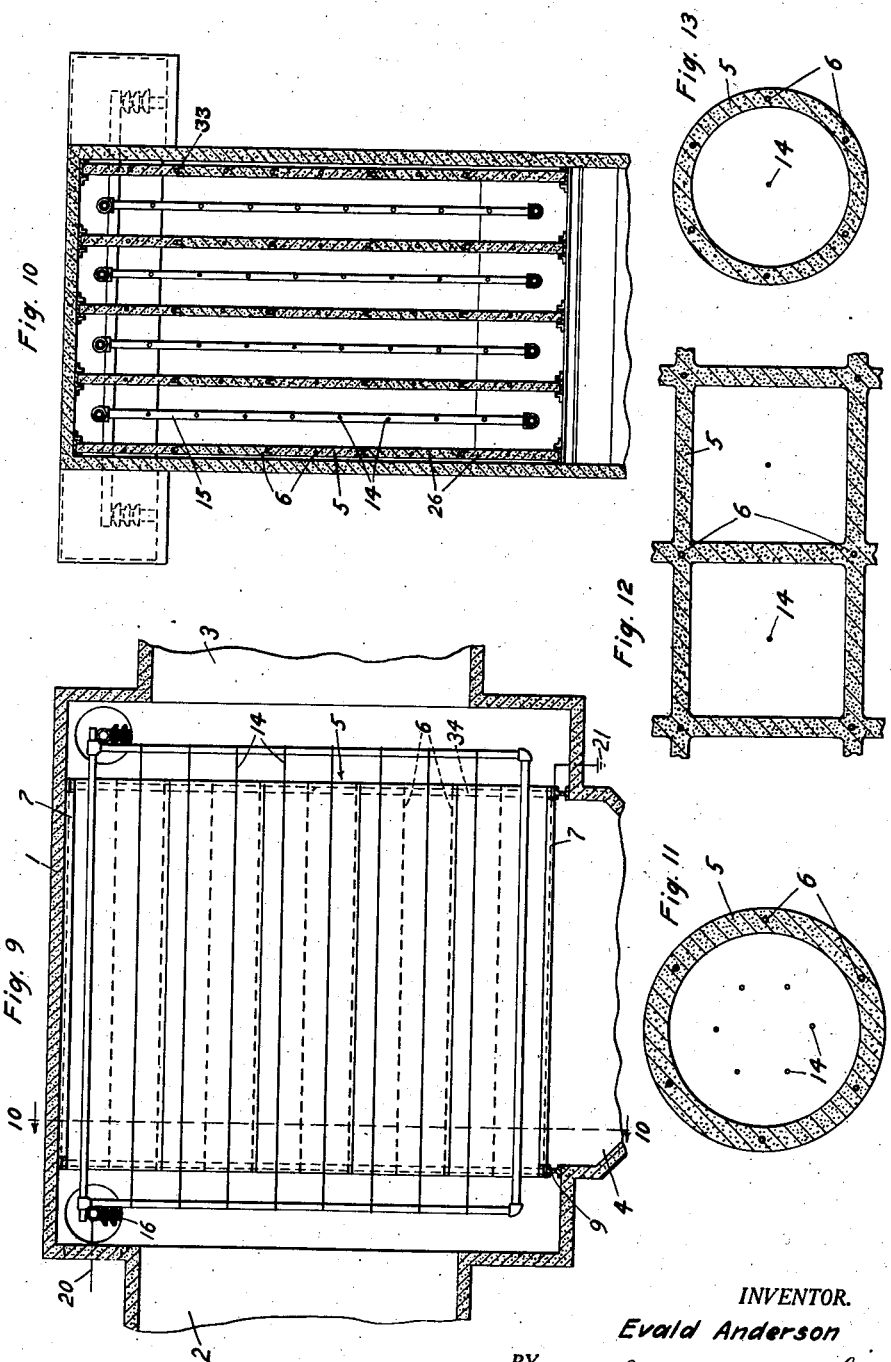

Patented June 9, 1925.

1,541,677

UNITED STATES PATENT OFFICE.

EVALD ANDERSON, OF ALHAMBRA, CALIFORNIA, ASSIGNOR TO INTERNATIONAL PRECIPITATION COMPANY, OF LOS ANGELES, CALIFORNIA, A CORPORATION OF CALIFORNIA.

APPARATUS FOR ELECTRICAL PRECIPITATION OF SUSPENDED PARTICLES FROM GASES.

Application filed April 24, 1924. Serial No. 708,800.

*To all whom it may concern:*

Be it known that I, EVALD ANDERSON, a citizen of the United States, residing at Alhambra, county of Los Angeles, State of California, have invented a new and useful Apparatus for Electrical Precipitation of Suspended Particles from Gases, of which the following is a specification.

This invention relates to means for separating suspended particles from gases by electrical precipitating action and the main object of the invention is to provide an electrical precipitator of improved construction and adapted for efficient operation under conditions which interfere with the successful operation of the usual electrical precipitating apparatus. A further object of the invention is to provide an electrical precipitator with electrodes of graded or controlled resistance, said electrodes being of relatively high resistance as compared with metallic electrodes and being so constructed as to provide for gradation of resistance in order to secure the utmost economy and efficiency in operation and being mounted in such manner as to provide for the requisite conductance for effective operation. Another object of the invention is to provide for substantially uniform electric field conditions between the electrodes of the electrical precipitator thereby obtaining maximum efficiency of operation.

My improved electrical precipitator comprises opposed collecting and discharge electrodes, means for directing the current of gas to be treated between the opposing electrodes and means for maintaining the electrodes at high potential difference so as to effect electrical precipitation of suspended particles from such gases, said collecting electrodes being according to my invention formed or built up of semi-conducting material formed for example as plates or bodies of concrete or the like, having metal conductors embedded or mounted therein and positioned in such manner with regard to the discharge electrodes as to provide for substantially uniform electrical field distribution.

The accompanying drawings illustrate embodiments of my invention and referring thereto:

Fig. 1 is a longitudinal section of one form of the invention.

Fig. 2 is a section on line 2—2 in Fig. 1.

Figure 4:
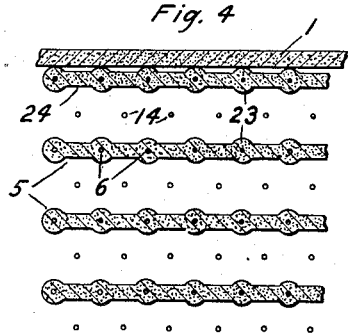
Figure 6:
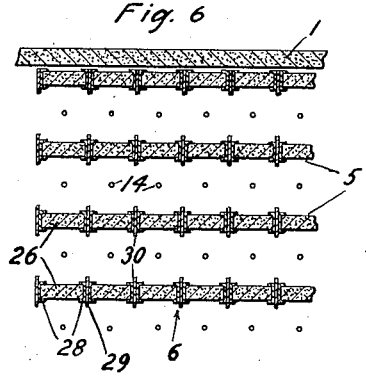
Figure 5:
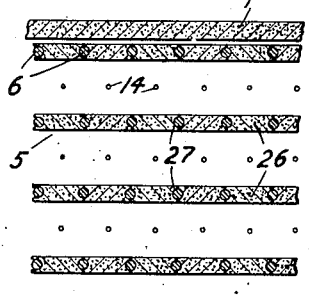

Figs. 4 to 6 inclusive show modified constructions of the collecting electrodes of the electrical precipitator.

Figure 7:
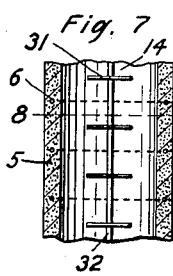

Fig. 7 is a vertical section of a modified form of the invention.

Figure 8:
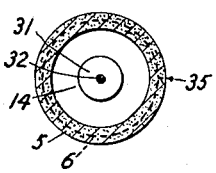

Fig. 8 is a section on lines 8—8 in Fig. 7.

Fig. 9 is a longitudinal vertical section of another modification of the invention.

Fig. 10 is a section on line 10—10 in Fig. 9.

Figs. 11, 12, and 13 are diagrammatic horizontal sections showing modifications of the invention.

The form of the invention shown in Figs. 1 and 2 comprises a flue or chamber 1 provided with an inlet 2 for the gases to be treated and an outlet 3 for the treated gases and with means 4, such as a hopper, for receiving the collected materials. Said precipitator further comprises any desired number, for example a series, of collecting electrodes 5 formed for example as plates or slabs of concrete and having embedded therein conductors formed as metal bars, rods, or chains 6 which also serve as reinforcement for the plate or slab member 5. Each plate or slab member 5 may also be provided with top and bottom metal bars or beams 7 formed for example as channel irons, the conductors 6 aforesaid being secured at their ends to these channel irons so that all of said conductors are in metallic connection with one another and are therefore in connection with the ground inasmuch as the supporting channel irons rest on grounded supports as hereinafter described. The channel irons or metallic members 7 rest on any suitable supporting means for example metal beams 9 which are mounted on the bottom of flue or chamber 1, said members 7 being spaced by any suitable means for example lugs 10 on said beams 9 and the collecting electrode members being spaced at their upper ends by lugs 11 mounted on the top member of the flue or chamber 1. The body of each electrode 5 may consist of Portland cement concrete or similar material formed for example of Portland cement, broken rock, and sand in usual proportions for Portland cement concrete, mixed with water and molded to the desired shape of a sheet, plate or slab, the wires, rods, or conductors 6 and the bars 7 being connected together and placed in position prior to the molding of the cement plate or slab so that the cement is in contact with the embedded conductors 6 and the conductors 7. The body of the collecting electrode may however be of any other suitable semi-conducing material, such as glass, terra-cotta, or terra-cotta containing conducting material, such as carbon, to give the required conductivity.

The treater further comprises discharge electrodes indicated at 14 mounted on any suitable supporting frame indicated at 15, said frame being carried by insulators 16 which are or may be enclosed in insulator boxes 17. The discharge electrodes 14 may consist of wires, rods, bars, or chains of metal or conducting material and having limited area as compared with the area of the collecting electrodes. Said discharge electrodes extend parallel to the surface of the opposing collecting electrodes, a series of discharge electrodes being arranged between adjacent collecting electrodes so that the sets of discharge electrodes alternate with the respective collecting electrodes. Furthermore said discharge electrodes extend parallel to the reinforcing and conducting elements 6 in the collecting electrodes and are preferably in alternate or staggered relation with respect to the said conducting members, as shown more particularly in Fig. 3, in such manner that each discharge electrode is opposite a semi-conducting portion indicated at 18, that is to say, a portion of the collecting electrode which is intermediate between the conducting members 6 thereof. In the form of the invention shown in Figs. 1 to 3 the discharge electrodes are illustrated as extending vertically and being mounted at their upper and lower ends on horizontal bars 19 of the supporting frames 15, and the conducting members 6 of the collecting electrodes also extend vertically. My invention however is not limited to such vertical arrangement of the electrodes and conducting members.

The high tension or discharge electrode system comprises the frame 15, and discharge electrodes 14, carried thereby and connected for example through a wire 20 to any suitable source of high tension electric current for example to a supply circuit including a rectifier and supplied by a step-up transformer from a source of alternating current as set forth in patent to F. G. Cottrell, No. 895,729, issued August 11, 1908. The collecting electrodes are grounded as indicated at 21.

In the operation of the invention high potential difference is maintained between the discharge electrodes and the collecting electrodes, such potential difference being for example from 10,000 to 100,000 volts according to the spacing of the electrodes and the nature of the gas being treated, and the gas to be treated is passed through the treater flue or chamber 1 so as to pass between the opposing discharge and collecting electrodes and to be subjected to the action of the electro-static field and to the electrical discharge (silent discharge) from the discharge electrodes with the result that suspended particles in the gases are collected on the electrodes, particularly on the collecting electrodes. It will be noted that the location of the discharge electrodes opposite the semi-conducting parts of the collecting electrodes tends to produce substantial or approximate uniformity in the electrostatic field intensity over the surface of the collecting electrodes. In an ordinary electrical precipitator of the plate type there is a tendency to concentration of the electrostatic field at those parts of the metal plates constituting collecting electrodes which are directly opposite and nearest to the discharge electrodes but with the above described construction wherein such directly opposing parts are of high resistance as compared with metal the tendency to such concentration of the electrical field at certain parts is minimized and the electro-static lines of force are distributed more uniformly with respect to the surface of the collecting electrodes. Any current passing from the discharge electrode by reason of ionization of the gases and passing to the collecting electrodes may be conducted away by the conductor members 6 in the adjacent part of the collecting electrodes. The resistance of the various paths traversed by the current in passing through the gases between the discharge electrode and the collecting electrode and in passing through a semi-conducting portion of the collecting electrode to the adjacent conductor member 6 is more or less equalized, by reason of the fact that as the length of the path traversed through the gas increases, the length of the portion of the path through the semi-conducting collecting electrode is correspondingly decreased so that by suitably predetermining the specific resistance of the semi-conducting body of the collecting electrode any desired approach to uniformity of distribution of the field can be secured.

By reason of the uniformity of the electro-static field in the electrical precipitator as above described more efficient precipitating operation is obtained than is possible where metal collecting electrodes are used.

It has also been found that with semi-conducting collecting electrodes of this character it is not necessary to rap or jar the collecting electrodes to remove precipitated material therefrom but that such material will fall by gravity from the collecting electrodes (said electrodes being vertical) before it builds up to any objectionable extent thereon. It will however generally be necessary to jar the discharge electrode system from time to time and this can be done whenever desired by rapping the supporting frame 15 for the said discharge electrodes, access thereto being had by suitable man-holes or other usual means not shown.

Figure 3:
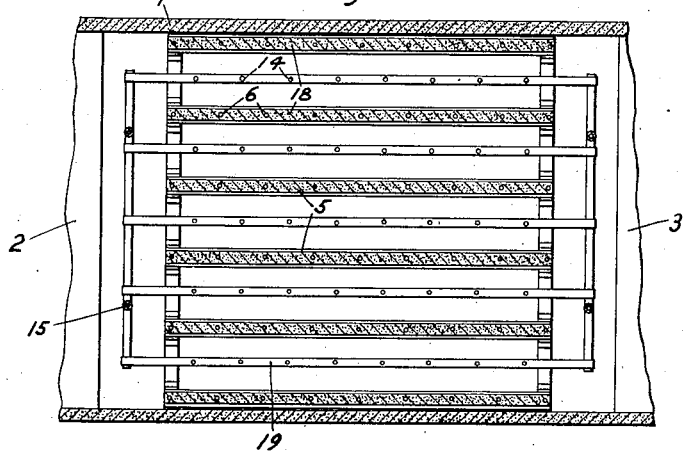
Fig. 3 is a section on line 3—3 in Fig. 1.

In the form of the invention shown in Figs. 1 to 3 the gas flow is horizontal and is transverse to the vertical direction in which the discharge electrodes and the conducting members in the collecting electrodes extend. With such an arrangement it is possible to provide for flanges on the collecting electrodes in order to reduce the tendency of the precipitated material to be carried along the electrodes by the gas stream. Such a construction is shown in Fig. 4, such construction being similar to that shown in Fig. 3 with the exception that the collecting electrodes are formed with enlargements, ribs or flanges indicated at 23 thereon, said ribs or flanges being formed of or mounted with a cement or concrete composition by which the body of the collecting electrodes are formed and being preferably adjacent or opposite the respective conducting members 6 so that the discharge electrodes 14 are opposite the spaces or pockets 24 between these ribs or flanges, this construction also contributing to a still greater approximation to uniformity in the electrostatic field.

As shown in Fig. 5 the collecting electrodes may be built up of sections indicated at 26 with the conducting members 6 formed as rods or bars extending between the adjacent sections 26, said sections 26 having grooves 27 fitting on said rods or bars. The construction may be otherwise as shown in Figs. 1 to 3. A still further modification is shown in Fig. 6 wherein the collecting electrode sections are mounted between vertical conducting members 6 which in this case are shown as comprising channel irons 28 embracing the respective collecting electrode sections 26 and a plate 29 extending between the adjacent channel irons and projecting to form flanges 30 which extend into the gas stream and perform in some respects the functions of the flanges shown in Fig. 4.

My invention is not limited to any particular direction of the electrodes as long as the discharge electrodes are parallel to and arranged in alternate relation to the conducting members in the collecting electrode. Thus as shown in Figs. 9 and 10 the discharge electrodes 14 and the conductor members 6 in the collecting electrodes 5 may extend horizontally, the collecting electrodes being shown as consisting of sections 26 of cement or semi-conducting material, with tongue and groove joints 33 and connected by tie rods 34 which also electrically and mechanically connect top and bottom bars 7 with the conducting members 6 embedded in the sections at the joints and also intermediate the joints. The construction is in other respects similar to that shown in Figs. 1 to 3. In this case the gas flow is parallel to the discharge electrodes.

My invention is not necessarily limited to a collecting electrode in the form of a plate or slab. In Figs. 7 and 8 a collecting electrode is shown consisting of a vertical tube of concrete or other semi-conducting material indicated at 5 having the conductors 6 embedded therein and formed as rings of metal wire or rod electrically connected to one another for example by a wire indicated at 35. The discharge electrodes 14 are in this case shown as formed of discs 31 mounted on a supporting rod or bar 32 which is mounted on supports and insulated in any suitable manner, and extends vertically and axially within the tubular electrode 5. The discharge elements 31 extend between or in alteration with the respective conductors 6 so that the edges of the members 31 are opposite the spaces of the semiconducting body 5 between the conductors 6 whereby approximate uniformity in the distribution of the electrical field is provided as above described. The edges of the discs 31 may be sharpened or serrated or otherwise formed so as to facilitate discharge therefrom.

A further modification of my invention is shown in Fig. 11 the collecting electrode being shown as consisting of a tubular member 5 formed of cement or concrete as above described and having conductors 6 embedded therein, said conductors being formed as vertical wires, rods, bars, or chains, which are connected together and grounded in any suitable manner, the said collecting electrode being supported or mounted in the usual manner of the tubular electrodes in electrical precipitators of the so-called multiple pipe design, such for instance as shown in patent to Schmidt and Roberts, No. 1,-252,183, dated January 1, 1918. The discharge electrodes 14 in this case may consist of wires, rods, bars, or chains extending vertically within the tubular collecting electrode and respectively opposite the spaces between the conducting members 6 and the collecting electrode so that said discharge electrodes are in alternate relation with respect to the conducting members in the collecting electrode. Said discharge electrodes are insulated and mounted in any suitable manner for example as indicated in patent to Schmidt and Roberts aforesaid, and the construction and operation of the electrical precipitator is otherwise precisely the same as above described.

My invention is of especial advantage in connection with an electrical precipitator of the cellular tubular type otherwise known as the square pipe treater, in which the collecting electrodes are formed as vertical tubular members in contiguous relation and of square or other polygonal cross section so as to give maximum electrode area for a given horizontal cross sectional area of the treater. Such a form of my invention is illustrated in Fig. 12, the collecting electrodes being formed as walls or partitions 5 of concrete or other semi-conducting material either formed in position or preformed and assembled in position to form a plurality of square or polygonal vertical tubes with a discharge electrode 14 extending vertically and centrally within each of said tubes. A conductor member 6 is in this case provided at the intersections of the walls or partitions 5, said conductor members 6 being connected together and grounded so as to furnish the necessary conductivity for the collecting electrodes as a whole. In this case the semi-conducting nature of the walls or partitions 5 constituting the body of the collecting electrode provides a graded resistance as above described so as to produce approximate uniformity in distribution of the electro-static field throughout the area of the collecting electrodes. The construction, mounting and insulation of the discharge electrodes 14 and the mounting of the collecting electrodes may be substantially the same as described in patent to L. Bradley, No. 1,325,136, dated December 16, 1919.

As shown in Fig. 13 my invention is also applicable in connection with a tubular treater having only a single discharge electrode 14 extending axially within a tubular collecting electrode 5 similar to the tubular collecting electrode shown in Fig. 11. In this case the effect of the semi-conducting material forming the body of the collecting electrode is to distribute or equalize the electrical field over the surface of the collecting electrode and the function of the conducting member 6 embedded in the collecting electrode is to distribute the current to the semi-conducting body of the collecting electrode so as to provide the necessary conductivity and uniformity in distribution of the field lengthwise of the tubular electrode. In this connection it is to be noted that the stated result, namely, equalization of the field intensity, depends on the fact that the conducting members in the collecting electrode are spaced apart such a distance that if the semi-conducting body 5 was absent there would be a considerable variation in electrical field intensity, the field being stronger adjacent said conducting members and weaker in the spaces between said conducting members. In each of the forms shown in the drawing the spacing between the conducting members in the collecting electrode is not less than the spacing between the said conducting members and the nearest discharge electrode, and in general such a condition will exist in an electrical precipitator constructed according to my invention. My invention however is applicable to any construction in which the conducting members in the collecting electrode are spaced so far apart that if it were not for the presence of the semi-conducting body in the semi-collecting electrode there would be a considerable variation of field strength in the gas receiving space between the electrodes. In this respect my invention is to be distinguished from constructions wherein the collecting electrode is formed of a conducting body in the form of metal plate or screen coated with semi-conducting material, since in the case of such metal plate or screen the conducting portions of the collecting electrode are spaced so closely and uniformly that there can be no considerable variation in electrical field intensity adjacent different parts of the collecting electrode surface and if the semi-conducting coating were removed in such case the conducting body consisting of a metal plate or screen would still be capable of functioning as a collecting electrode. In my present invention the conducting members are in any case spaced so far apart that if the semi-conducting body of the collecting electrode were removed these conducting members could not operate effectively as a collecting electrode on account of their small total area and of the considerable variation in field intensity which would result in sufficiently strong field intensity adjacent each of said conducting members to cause a tendency to ionization from said conducting members which would neutralize or oppose the precipitating action due to ionization from the discharge electrodes. The collecting electrodes in the present invention therefore consist in the semi-conducting body and the conducting members are simply elements for conducting current to or from the several parts of said semi-conducting body, the actual distribution of current to the surface of the electrode being effected by the semi-conducting body itself.

In each of the forms of the invention shown in Figs. 11 to 13 the gas flow will be vertically through the tubular collecting electrodes in the same manner as in the Schmidt and Roberts patent and in the Bradley patent above referred to and it will be understood that by suitable modifications a vertical gas flow may be provided for in the form of the invention shown in Figs. 1 to 3, the inlet and outlet for the flue or chamber in that case being so arranged as to provide for such vertical flow.

While it is in some cases preferred to provide for operation of the electrical precipitating apparatus above described by means of a rectified current it is also possible in some cases to operate such apparatus by alternating current, the discharge electrode and the collecting electrode conductors being in that case connected to opposite sides of a source of alternating current presenting high potential difference, for example in each of the forms of the invention described the discharge electrode system may be connected to one side of the secondary of the high tension transformer, the other side of the said secondary being grounded and the collecting electrodes of the precipitating apparatus being also grounded by a ground connection of the conducting members 6 thereof.

The metallic conducting members which are embedded in the concrete or cementitious body of the collecting electrodes serve not only as conducting means for the current but also as mechanical re-enforcing means for such body.

What I claim is:

1. An electrical precipitator comprising a collecting electrode formed of a body of semi-conducting material, parallel conducting members extending in said body of semi-conducting material, and insulated discharge electrodes extending parallel to the collecting electrode and to the conductor members therein and arranged in alternate or staggered relation to the conducting members in the collecting electrode and equidistant from opposing conductor members so as to be opposite the spaces between said conducting members for the collecting electrodes.

2. In an electrical precipitator a collecting electrode comprising a body formed of semi-conducting material and conductor members extending parallel in specific relation in said body and discharge electrodes extending parallel to the conductor members in the collecting electrodes and arranged in alternate relation to the conductor members in the collecting electrode so as to be opposite the semi-conducting body portions of the collecting electrode between the conductor members therein.

3. An electrical precipitator comprising a collecting electrode formed of a body of semi-conducting material, parallel conducting members extending in said body of semi-conducting material, and discharge electrodes insulated from the collecting electrodes and extending parallel to the collecting electrode and the conductor members therein, the relative positions of said discharge electrodes and of said conducting members being such that the portions of the collecting surface of the collecting electrodes which are furthest from said conducting members are nearest to said discharge electrodes.

4. In an electrical precipitator a collecting electrode comprising a body of semi-conducting material, conducting members extending in contact with said body, means for connecting said conducting members to ground, and insulated discharge electrodes opposing said collecting electrode, said discharge electrodes extending parallel to the collecting electrodes and to the conducting members therein and arranged opposite the parts of said body of semi-conducting material which are between the said conducting members therein, so as to tend to equalize the distribution of electrical field intensity over the surface of the conducting electrode.

5. In an electrical precipitator, a collecting electrode comprising a body of semi-conducting material, parallel conductor members extending in contact with said body of semi-conducting material at distributed portions thereof, means electrically connecting said parallel conductor members to one another and to ground, discharge electrodes insulated from the collecting electrode and extending parallel to the conductor members therein but in alternate relation so as to be opposite the spaces between said conductor members in the collecting electrode and means for maintaining said discharge and collecting electrodes at high potential difference.

6. In an electrical precipitator a plurality of collecting electrodes each comprising a body of semi-conducting material and conductor members extending in said body, said conductor members being parallel to one another and being grounded, and a plurality of discharge electrodes insulated from the collecting electrodes and extending parallel to the collecting electrodes and to the conducting members therein, said discharge electrodes being arranged opposite the parts of the collecting electrodes which are between the conducting members therein.

7. In an electrical precipitator a collecting electrode comprising a body of semi-conducting material, a plurality of conductor members extending therein and a discharge electrode extending parallel to the surface of the collecting electrode, said conducting members in the collecting electrode being parallel to one another and to the discharge electrode and being spaced apart a distance which is not less than the distance between the said conducting members and the discharge electrode so that the body of semi-conducting material of the semiconducting electrode extending between said conducting members forms a high resistance path for the electric current from the discharge electrode to the conducting members in the collecting electrode and thereby equalizes the electrical intensity at various points of the field between the discharge electrode and the said conducting members.

8. In an electrical precipitator a collecting electrode consisting of a body of semiconducting material and conductor members extending within said body parallel to one another and spaced a considerable distance apart so as to tend to produce a considerable variation in field intensity in the space adjacent the collecting electrode and a discharge electrode extending parallel to the collecting electrode and to the conductor members therein and spaced substantially equidistant from opposing conducting members in the collecting electrodes and the semi-conducting body of the collecting electrode being of sufficient resistance to tend to equalize the distribution of electrical field intensity between the discharge electrode and the surface of the collecting electrode.

In testimony whereof I have hereunto subscribed my name this 17th day of April, 1924.

EVALD ANDERSON.